Aug. 16, 1932.  C. E. SUMMERS  1,872,194

SELF CLEANING CONNECTING ROD BEARING

Filed June 13, 1930

Inventor
Caleb E. Summers

By Blackmore, Spencer & Hink
Attorneys

Patented Aug. 16, 1932

1,872,194

UNITED STATES PATENT OFFICE

CALEB E. SUMMERS, OF PONTIAC, MICHIGAN, ASSIGNOR TO GENERAL MOTORS CORPORATION, OF DETROIT, MICHIGAN, A CORPORATION OF DELAWARE

SELF CLEANING CONNECTING ROD BEARING

Application filed June 13, 1930. Serial No. 460,903.

This invention relates to internal combustion engines and has particular reference to a means for cleaning the crankpin bearings of the crankshaft.

In prior lubricating systems of internal combustion engines, the cranks and crankpins of the crankshaft have been provided with lubricant passages or ducts which transmit oil through a bore in each connecting rod to each wrist pin. As is well known, the oil of an internal combustion engine used on automotive vehicles becomes contaminated with grit and fine particles of impurities, which experience has shown tend to collect in the crankpin bearing opposite the duct. It is an object of the present invention to provide a means which will eliminate this collection of grit and fine particles in the crankpin bearing and remove the same on each revolution of the crankpin.

There is accordingly provided in the cap which secures the connecting rod to the crankpin, an opening which mates with or conforms to the duct in the crankpin once per revolution so that the pressure lubricating system will force a shot of oil into the oil pan and remove any impurities which may have collected. The duct and opening are so arranged that they will mate when the throw of the crankshaft or the connecting rod bearing is in its lowermost position.

Figure 1:
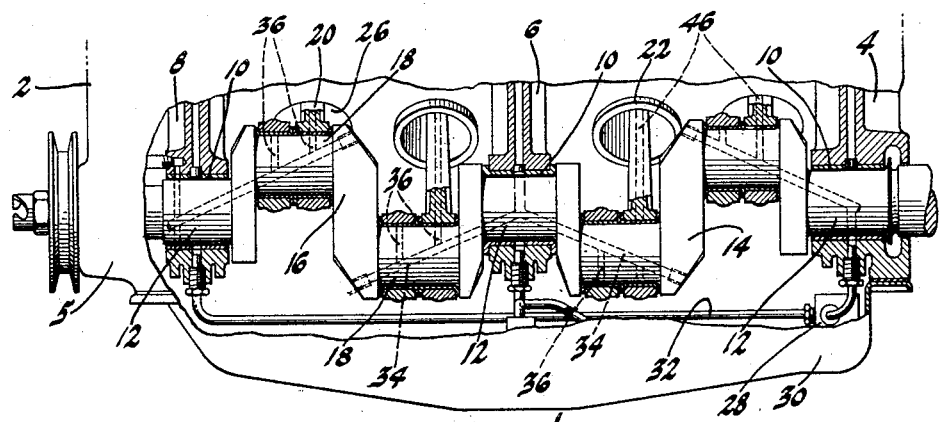
Figure 1 is a side view of a portion of an internal combustion engine with parts shown in section to illustrate the invention.
Figure 2:
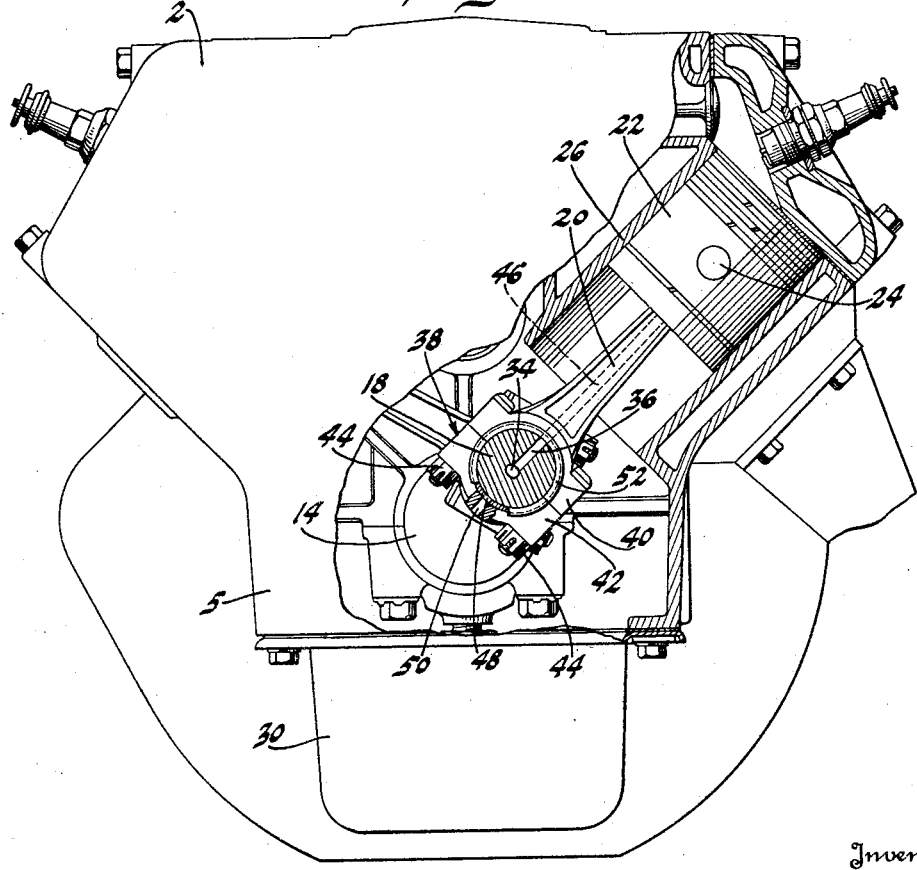
Figure 2 is an end view of the engine of Figure 1 with parts shown in section to illustrate the invention.

Referring to the drawing, the numeral 2 indicates a V-type 8-cylinder internal combustion engine. The engine is provided with a crankcase 5 having the ribs 4, 6 and 8 which have bearings 10 to support the bearing portions 12 of the crankshaft 14. The crankshaft is provided with the usual throws 16 and crankpins 18 to which are connected the connecting rods 20 joined to the pistons 22 by means of the wrist pins 24. The pistons 22 operate in the cylinders 26 in the usual manner.

The usual oil pump is shown at 28 mounted in the oil pan 30. The pump takes the oil from the oil pan and delivers it to an oil manifold 32 which in turn passes the oil to the bearings 10 of the crank shaft. The crankshaft is provided with suitable passages or ducts 34 which deliver the oil from the bearings 10 to the crankpins 18. Each crank pin has the ducts or passages 36 leading to the bearing 38 of each connecting rod.

The bearing 38 comprises the upper portion 40 formed integral with the connecting rod 20 and the lower cap portion 42 secured to the upper portion 40 by means of the machine bolts 44. The ducts 34 and 36 deliver oil to the interior of the bearing and once per revolution the duct 36 will mate with or conform to the passage 46 in the connecting rod 20 to cause a shot of oil to pass upwardly toward the wrist pin 24 to lubricate the same.

In prior crankpin bearings, it has been found that there is a tendency for grit or fine impurities in the oil to gather in the crankpin bearing opposite the duct 36 which tends to score the bearing. It has been found by experiment that if openings such as indicated at 48 and 50 are made in the bearing metal 52 and in the cap 42 so that once per revolution the duct 36 will conform thereto and permit a shot of oil to be forced outwardly into the oil pan, that it will remove the tendency of the grit or impurities to collect in the bearing and thus prevent scoring. The duct 36 and openings 48 and 50 are arranged so that they will mate when the throw 16 of the crankshaft is in its lowermost position.

As a result of the invention, the crankpin bearing has been considerably improved in that the collection of impurities is prevented which will prevent the scoring of the bearing.

I claim:

1. In a bearing, in combination with a crankshaft having a crankshaft pin rotatable in said bearing, a cap forming a part of said bearing, said cap having an opening communicating with the atmosphere, and a lubricant duct in said pin adapted to register with said opening once per revolution.

2. In a bearing, in combination with a crankshaft having a crankshaft pin rotatable in said bearing, a cap forming a part of said bearing, said cap having an opening communicating with the atmosphere, and a lubricant duct in said pin adapted to register with said opening once per revolution when said crankpin is in its lowermost position.

3. In a bearing, in combination with a crankshaft having a connecting rod connected to a crankpin thereof, a connecting rod cap securing said connecting rod to said pin and with the rod forming a bearing, said cap having an opening communicating with the atmosphere, a lubricant duct in said pin registering with said opening once per revolution and at the lowermost position of said crankpin to force a shot of oil outward to free the bearing of foreign matter.

4. In a bearing, in combination with a crankshaft having a connecting rod connected to a crankpin thereof, said rod having an oil channel for conducting lubricant from the crankshaft, a connecting rod cap securing said connecting rod to said pin and with the rod forming a bearing, said cap having an opening at its lowermost part communicating with the atmosphere, a lubricant duct in said pin registering with said opening once per revolution and at the lowermost position of said crank pin to force a shot of oil outward to free the bearing of foreign matter, said oil channel being opposite said opening.

In testimony whereof I affix my signature.

CALEB E. SUMMERS.